Dec. 21, 1937.   P. SCHOONENBERG ET AL   2,103,043
GASEOUS ELECTRIC DISCHARGE DEVICE
Filed July 22, 1935
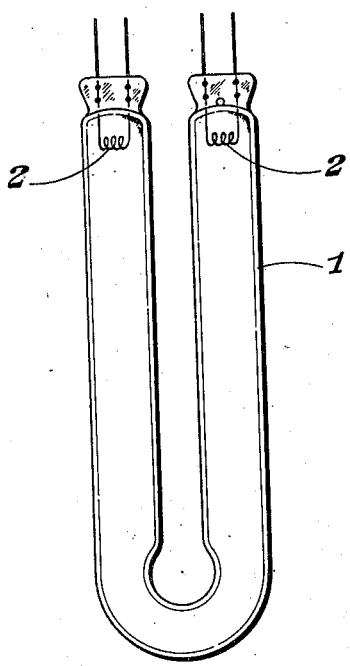
INVENTORS
Pancras Schoonenberg
Josephus A. M. Smelt
BY Harry E. Dunham
ATTORNEY Patented Dec. 21, 1937

2,103,043

UNITED STATES PATENT OFFICE 2,103,043

GASEOUS ELECTRIC DISCHARGE DEVICE

Pancras Schoonenberg and Josephus A. M. Smelt, Eindhoven, Netherlands, assignors to General Electric Company, a corporation of New York Application July 22, 1935, Serial No. 32,608
In Germany July 26, 1934

3 Claims. (Cl. 176—122)

The present invention relates to gaseous electric discharge devices generally and more particularly the invention relates to such devices the gaseous atmosphere of which consists of or comprises the vapor of an alkali metal, such as sodium.

The usual container glasses for incandescent lamps or gaseous discharge lamps, such as lime glass, lead glass, soda glass, or the like are not suitable for use as container glasses for alkali vapor lamps since these glasses are rapidly blackened by the alkali metal vapor. Attempts have been made to supply a glass suitable for use as a container-glass for alkali vapor lamps. One type of glass proposed contained no silica and had a large content of boric oxide together with one or more of the oxides of alkalies, alkali earths, aluminum and magnesium. While this glass successfully resists the destructive action of alkali metal vapor it is difficult to work and is hygroscopic.

More recently a boro-silicate glass has been proposed which contains an appreciable amount of silica. A typical composition of such glass is the following:—

|   | Per cent |
|---|---|
| Sodium oxide ($Na_2O$) | 4 to 5 |
| Aluminium oxide ($Al_2O_3$) | 11 to 13 |
| Calcium oxide (CaO) | 10 to 11 |
| Boric oxide ($B_2O_3$) | 40 to 60 |
| Silica ($SiO_2$) | 10 to 25 |

The boro-silicate glass is less hygroscopic than the boric oxide glass, is readily workable and many sodium lamps having containers made of this glass have been manufactured.

We have observed however, that the above boro-silicate glass cannot be successfully used as the container glass for alkali vapor lamps having a positive column discharge with a large voltage gradient and a large current density. This type of vapor lamp is a highly efficient light source but prior to our discovery was not available in commerce since the easily workable, vapor resistant, boro-silicate glasses successfully used in other types of alkali vapor lamps become blackened after the lamps of the positive column type have been operating a short time. Our explanation for this phenomenon is that in this type of lamp the large voltage gradient is accompanied by high electron velocity which in turn is accompanied by an intensive lateral field. The lateral field is concentrated in a thin layer at the inner surface of the container. The vapor ions in the vicinity of the thin lateral field are attracted thereby and strike the inner surface of the container at high velocity. This heavy ionic bombardment causes discoloration of the glass which reduces the light out-put, particularly when the current density is high. The useful life of such a lamp is so short as to be infeasible commercially. This is particularly true when the voltage gradient is greater than 2.2 volts per cm. and the current density is higher than 0.4 ampere per $cm^2$.

We have discovered that a boro-silicate glass containing less than 10% of silica, does not blacken when used on the inner surface of the container of a gaseous electric discharge lamp of the positive column type which has a voltage gradient greater than 2.2 volts per cm. along the positive column discharge and a current density greater than 0.4 ampere per $cm^2$. We have also discovered that the resistance of the glass to blackening increases as the silica content thereof decreases. When the voltage gradient and the current density is greater than the values given above the silica content of the glass is preferably less than 10%. Since the silica makes the glass workable it is desirable that the glass contain some silica.

In the drawing accompanying and forming part of this specification a gaseous electric discharge lamp embodying the present invention is shown schematically.

Referring to the drawing the lamp comprises a tubular, U-shaped container I having a thermionic electrode 2 sealed into each end thereof. Each of said electrodes 2 consists of a heater filament, such as a tungsten filament, in operative relation to a body of electron emitting material, such as a coating of barium oxide. Said container has a rare starting gas therein, such as neon at a pressure of 10 mm. and a small percentage of argon, and a quantity of sodium therein the vapor of which is light emitting during the operation of the lamp. The internal diameter of the parallel legs of said container I is 12.5 mm. and the distance between the electrodes 2 is 62 cm. measured along the axis of the container I. The operating voltage of the lamp is approximately 170 volts and the current density is approximately 0.6 ampere. The voltage gradient along the positive column is 2.66 volts per cm. and the current density is approximately 0.5 ampere per cm². A glass of the following composition does not become blackened in a lamp of this type and the lamp has a long useful operating life:—

| | Per cent |
|---|---|
| Silica (SiO₂) | 6 |
| Boric oxide (B₂O₃) | 53 |
| Aluminium oxide (Al₂O₃) | 15 |
| Calcium oxide (CaO) | 10 |
| Sodium oxide (Na₂O) | 16 |

We prefer to make the container 1 of flashed glass, that is, the container 1 consists of two glass layers the outer layer being of one of the usual container glasses, well known in the art, and the inner layer of an alkali vapor resistant glass having the above composition.

While we have shown and described and have pointed out in the annexed claims certain novel features of the invention, it will be understood that various omissions, substitutions and changes in the forms and details of the device illustrated and in its use and operation may be made by those skilled in the art without departing from the spirit and scope of the invention.

What we claim as new and desire to secure by Letters Patent of the United States, is:—

1. In combination a gaseous electric discharge device of the positive column type comprising a container, electrodes sealed therein, a gaseous atmosphere therein comprising an alkali metal vapor, and means to supply sufficient electrical energy to said device to cause a voltage drop along the positive column discharge greater than 2.2 volts per cm. and a current density in said discharge greater than 0.4 ampere per cm.², the inner surface of said container being of a borosilicate glass containing less than 10% silica and more than 11% alkali oxide.

2. In combination a gaseous electric discharge device of the positive column type comprising a container, electrodes sealed therein, a gaseous atmosphere therein comprising an alkali metal vapor, and means to supply sufficient electrical energy to said device to cause a voltage drop along the positive column discharge greater than 2.2 volts per cm. and a current density in said discharge greater than 0.4 ampere per cm.², the inner surface of said container being of a borosilicate glass having the following composition:—

| | Percent |
|---|---|
| Silica (SiO₂) | 6 |
| Boric oxide (B₂O₃) | 53 |
| Aluminium oxide (Al₂O₃) | 15 |
| Calcium oxide (CaO) | 10 |
| Sodium oxide (Na₂O) | 16 |

3. In combination a gaseous electric discharge device of the positive column type comprising a container, electrodes sealed therein, a gaseous atmosphere therein comprising an alkali metal vapor, and means to supply sufficient electrical energy to said device to cause a voltage drop along the positive column discharge of approximately 2.66 volts per cm. and a current density in said discharge of approximately 0.5 ampere per cm.², the inner surface of said container being of a glass having the following composition:—

| | Percent |
|---|---|
| Silica (SiO₂) | 6 |
| Boric oxide (B₂O₃) | 53 |
| Aluminium oxide (Al₂O₃) | 15 |
| Calcium oxide (CaO) | 10 |
| Sodium oxide (Na₂O) | 16 |

PANCRAS SCHOONENBERG.
JOSEPHUS A. M. SMELT.